United States Patent

Nishio

[11] Patent Number: 6,070,186
[45] Date of Patent: May 30, 2000

[54] VIDEO SERVER AND VIDEO-ON-DEMAND SYSTEM CAPABLE OF EFFECTIVELY TRANSMITTING A SPECIAL VIDEO PROGRAM

[75] Inventor: Makoto Nishio, Tokyo, Japan

[73] Assignee: NEC Corporation, Tokyo, Japan

[21] Appl. No.: 08/667,849

[22] Filed: Jun. 20, 1996

[30] Foreign Application Priority Data

Jun. 21, 1995 [JP] Japan .................................... 7-154803

[51] Int. Cl.[7] .................................................. H04N 7/10
[52] U.S. Cl. ................................ 709/217; 348/7; 348/12
[58] Field of Search .............................. 348/7, 9, 12, 13; 455/4.2, 5.1; 345/327; 709/217; H04N 7/16, 7/173

[56] References Cited

U.S. PATENT DOCUMENTS

| | | | |
|---|---|---|---|
| 5,247,347 | 9/1993 | Litteral et al. | 358/85 |
| 5,371,532 | 12/1994 | Gelman et al. | 348/7 |
| 5,410,343 | 4/1995 | Coddington et al. | 348/7 |
| 5,506,615 | 4/1996 | Awaji | 348/7 |
| 5,508,732 | 4/1996 | Bottomley et al. | 348/7 |
| 5,528,282 | 6/1996 | Voeten et al. | 348/7 |
| 5,659,351 | 8/1997 | Huber | 348/7 |
| 5,790,174 | 8/1998 | Richard, III et al. | 348/7 |

FOREIGN PATENT DOCUMENTS

| | | | |
|---|---|---|---|
| 0 355 697 | 2/1990 | European Pat. Off. | H04N 7/173 |
| 0 656 728 | 6/1995 | European Pat. Off. | H04N 7/173 |

OTHER PUBLICATIONS

Ghafir, H., et al., "Multimedia Servers—Design and Performance", *IEEE*, 1994, pp. 886–890.

*Primary Examiner*—Andrew I. Faile
*Assistant Examiner*—Habte Bahgi
*Attorney, Agent, or Firm*—Young & Thompson

[57] ABSTRACT

In a video server used for a video-on-demand system, a special video program, such as a commercial video program, is transmitted from a special video storage unit of the video server to each subscriber terminal within a nontransmission time which takes place during a searching time for a video program requested by the subscriber and/or during an execution time of a specific reproduction control command, such as a "FAST-FORWARD" command, a "FAST-REWIND" command. The transmission of the special video program is not stopped even when a reproduction control command is given from the subscriber to the special video storage unit by judging the reproduction control command to be invalid while a reproduction control command related to video programs different from the special video program is executed by judging the commands to be valid.

7 Claims, 9 Drawing Sheets

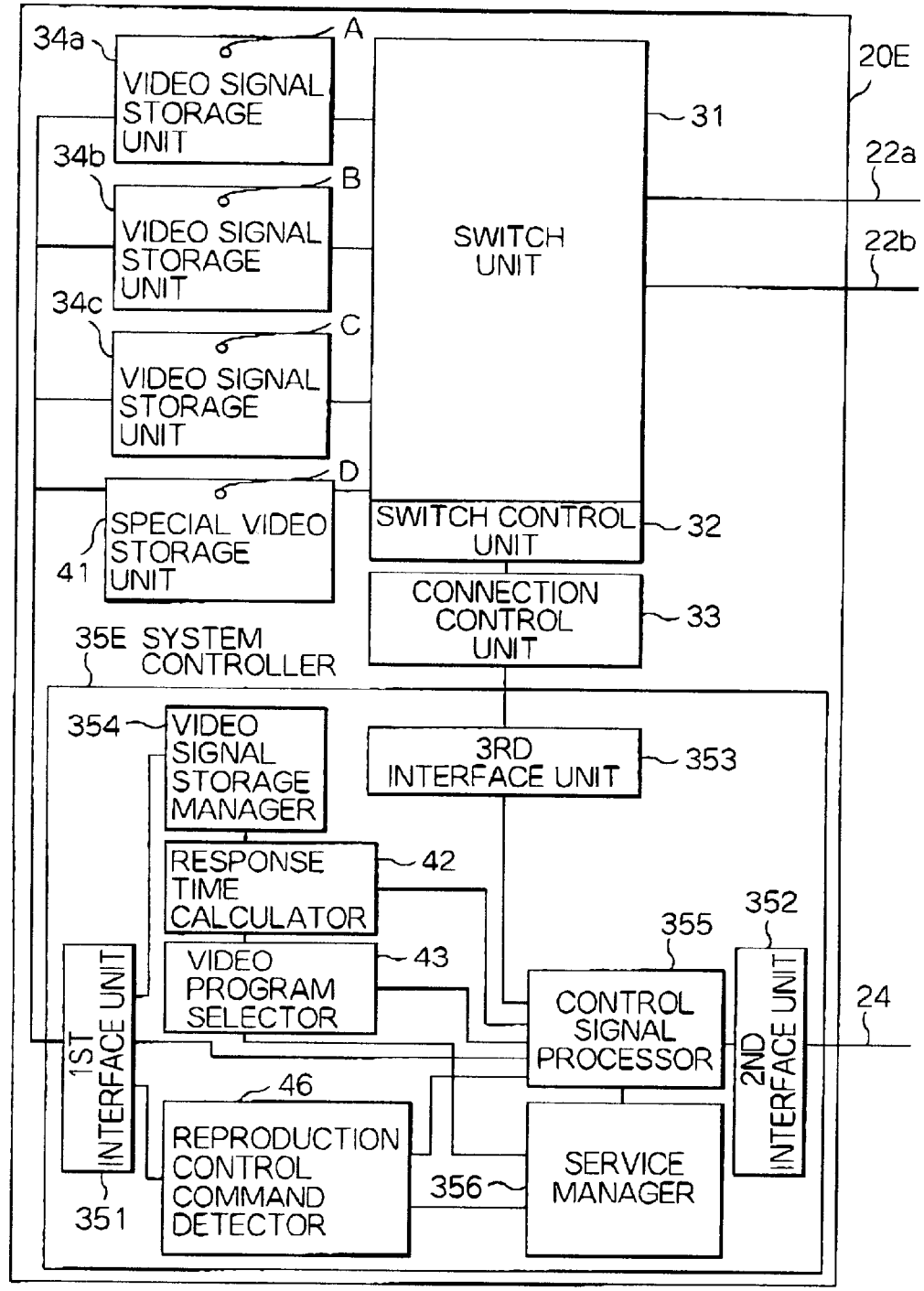
F I G. 7

VIDEO SERVER AND VIDEO-ON-DEMAND SYSTEM CAPABLE OF EFFECTIVELY TRANSMITTING A SPECIAL VIDEO PROGRAM

BACKGROUND OF THE INVENTION

This invention relates to a video server which delivers a video program to subscriber terminals in a video-on-demand (abbreviated to VOD) system.

With the latest development of a digital transmission technique and a compression and expansion technique of a digital signal, a video service system has been researched and noticed which provides an interactive video service between a plurality of subscribers or subscriber terminals and a video server and which may be generally called a video-on-demand (VOD)system It has been predicted that such a VOD system would be widely used in the future in the world.

Herein, such a VOD system can be distinguished from a CATV system of a broadcast type in that each subscriber terminal is in one-to-one correspondence with each of the video programs in the VOD system and interactive control or service can be executed between the subscriber terminal and the video server.

Description has been made about a conventional VOD system in the paper which is published by Hatem Ghafir et al in Proceedings of IEEE GCOM '94, pages 886 to 890 and entitled "Multimedia servers-design and performance". Similar system has also been published in the U.S. Pat. No. 5,247,347 issued to Larry A. Litteral et al. Such conventional VOD systems have a video server including a plurality of video storage units and might provide an interactive video service from the video server to each of subscriber terminals in principle.

However, the conventional VOD systems have a lot of problems to be solved when such systems are put into practical use. This is because adequate consideration has not been given to various kinds of request commands and the like which are sent from the subscriber terminals and about functions of the video server required to process the various commands.

More specifically, when a subscriber terminal requests transmission of a video program to a video server, a nontransmission time or an idle time during which no video program is transmitted to the subscriber terminal inevitably takes place in the conventional systems. For example, such a nontransmission time or an idle time occurs while the subscriber terminal requests a certain video program and waits for transmission of the video program requested by the subscriber terminal. In this event, the idle time is mainly determined by a time which is spent until the video storage unit is put into a reproducible state of the video program stored in the video storage unit. Specifically, when the video program is reproduced from a video cassette recorder prepared as the video storage unit in the video server, the idle time depends on a response time for searching for a leading portion of the video program in question in the video cassette recorder. Practically, the response time is varied in the video cassette recorder from less than one second to several tens of seconds depending on concentration of requests to the video cassette recorder.

At any rate, such an idle time occurs more or in the video cassette recorder. In the conventional VOD systems, the idle time is wasted in vain without providing any service and is therefore inconvenient for both a service provider and subscribers.

Herein, it is to be noted that various kinds of request control commands, such as a "PAUSE" command, a "FAST-FORWARD" command, a "FAST-REWIND" command, are sent from subscriber terminals to the video server in the conventional VOD systems with a video program received by the subscriber terminals, to transiently stop, to quickly forward, to quickly rewind the video program, and the like. Such "PAUSE" command, "FAST-FORWARD" command, "FAST-REWIND" command may be collectively referred to as specific reproduction control commands.

Supplied with the specific reproduction control commands from the subscriber terminals, the video server executes each of the specific reproduction control commands. During the execution of the specific reproduction control commands, the subscriber terminals can know the specific reproduction control commands that are being executed by a message displayed but can not receive any video service. This shows that a nontransmission time or an idle time occurs during execution of the specific reproduction control commands.

Furthermore, it should be noted that an advertisement or commercial video program may be prepared by a program sponsor or supplier who pays commercial fees to a service provider. On the other hand, each of the subscribers can send the reproduction control commands to the video server, as mentioned above. Under the circumstances, it is possible for each subscriber to skip or neglect such an advertisement or commercial video program by the use of such a reproduction control command, for example, the "FAST-FORWARD" or the "FAST-REWIND" commands As a result, the commercial video program is not watched by the subscribers. This results in a reduction of efficiency of the advertisement or commercial program given by the program sponsor and finally brings about a decrease of advertising revenue for the service provider.

SUMMARY OF THE INVENTION

It is an object of this invention to provide a video server which is applicable to a VOD system and which is capable of effectively using a nontransmission time or an idle time of a video program.

It is another object of this invention to provide a video server of the type described, which can effectively transmit a commercial video program to subscriber terminals.

It is still another object of this invention to provide a video server of the type described, which can transmit a special video program within an idle time.

It is yet another object of this invention to provide a video server of the type described, wherein the special video program can last even when a reproduction control command is given to the video server.

It is another object of this invention to provide a video server system which is capable of flexibly controlling the video server.

A video server to which this invention is applicable is for use in delivering a video program to a subscriber terminal in response to a request sent from the subscriber terminal. According to an aspect of this invention, the video server comprises video storage means for storing the video program to produce a reproduced video program representative of the video program, a special video storage for storing a special video program to produce a reproduced special video program representative of the special video program, switching means for switching the reproduced video program and the reproduced special video program from one to another in response to a connection control signal to send a selected one of the reproduced video programs and the reproduced special video program to the subscriber terminal, control means operable in response to the request for controlling the video storage means, the special video storage, and the switching means, to produce a selection signal representative of selection of the special program even when the request requires delivery of the video program to the subscriber terminal, and connection signal supply means for supplying the selection signal as the connection control signal to the switching means to make the special video storage transmit the reproduced special video program to the subscriber terminal.

According to another aspect of this invention, a video server is for use in delivering the video programs to a plurality of subscriber terminals in response to a request sent from each of the subscriber terminals. The video server comprises a plurality of video storage units for storing the video programs to produce reproduced video programs representative of the video programs, respectively, a special video storage unit for storing a special video program to produce a reproduced special video program representative of the special video program, switching means for switching the reproduced video programs and the reproduced special video program from one to another in response to a connection control signal to send a selected one of the reproduced video programs and the reproduced special video program to each of the subscriber terminals, control means operable in response to the request for controlling the video storage means, the special video storage, and the switching means, to produce a selection signal representative of selection of the special program even when the request requires delivery of the video program to each of the subscriber terminals, and connection signal supply means for supplying the selection signal as the connection control signal to the switching means to make the special video storage transmit the reproduced special video program to each of the subscriber terminals that issues the request to the video server, The control means comprises response time calculating means, responsive to the request, for calculating a response time required to reproduce each of the video programs requested by each of the subscriber terminals, selecting means coupled to said response time calculating means for selecting the special video program during the response time to produce a special video selection signal representative of selection of the special video program, and processing means for processing the special video selection signal to send the connection control signal to the connection signal supply means and to make the switching means transmit the special video program to the subscriber terminal during the response time and to thereafter make the switching means transmit each of the video programs requested by each of the subscriber terminals.

According to still another aspect of this invention, the video server is for use in delivering a plurality of video programs to a plurality of subscriber terminals in response to a reproduction control command which is sent from each of the subscriber terminals and which includes a specific reproduction control command which stops transmission of the video programs to the subscriber terminals during execution of the specific reproduction control commands The video server comprises a plurality of video storage units for storing the video programs to produce reproduced video programs representative of the video programs, respectively, a special video storage unit for storing a special video program to produce a reproduced special video program representative of the special video program, switching means for switching the reproduced video programs and the reproduced special video program from one to another in response to a connection control signal to send a selected one of the reproduced video programs and the reproduced special video program to each of the subscriber terminals, control means operable in response to the reproduction control command for controlling the video storage units, the special video storage unit, and the switching means, to produce a selection signal representative of selection of the special program when the reproduction control command is detected as the specific reproduction control command, and connection signal supply means for supplying the selection signal as the connection control signal to the switching means to make the special video storage unit transmit the reproduced special video program to each of the subscriber terminals that issues the specific reproduction control command and to thereafter transmit each of the video programs to each of the subscriber terminals.

According to yet another aspect of this invention, the video server comprises control means, operable in response to a reproduction control command which is sent from each of the subscriber terminals and which Is classified into a first command related to the video programs and a second command related to the special video program, for controlling the video storage units, the special video storage unit, and the switching means, in different manners determined for the first and the second command, respectively.

BRIEF DESCRIPTION OF THE DRAWING

FIG. 7 is a block diagram of a video server according to a fifth embodiment of this invention;

DESCRIPTION OF THE PREFERRED EMBODIMENTS

Figure 1:
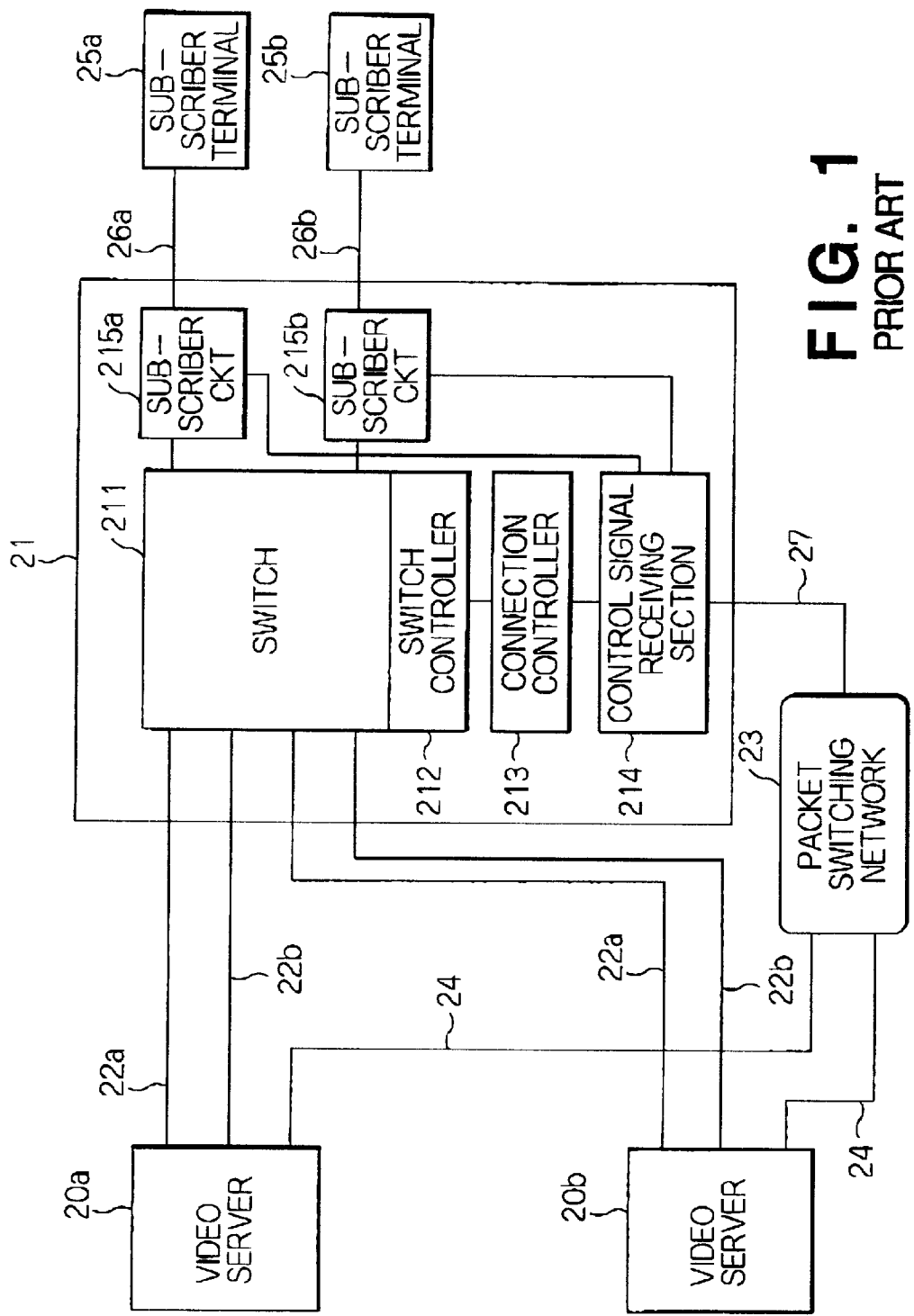
FIG. 1 is a block diagram of a video-on-demand (VOD) system to which this invention is applicable.

Referring to FIG. 1, a video-on-demand (VOD) system to which this invention Is applicable includes a plurality of video servers which are exemplified by two video servers 20a and 20b and which are similar in structure and operation to one another. Each of the video servers 20a and 20b is connected to an exchange 21 through a plurality of video signal transmission paths specified by two paths 22a and 22b on one hand and is connected to a packet switching network 23 through a control signal transmission path 24 on the other hand.

A plurality of subscriber terminals exemplified by two subscriber terminals 25a and 25b in FIG. 1 are connected to the exchange 21 through subscriber lines 26a and 26b.

The exchange 21 is connected to the packet switching network 23 through a control signal line 27 and includes a switch 211, a switch controller 212, a connection controller 213, a control signal receiving section 214, and a plurality of subscriber circuits specified by two subscriber circuits 215a and 215b.

In the illustrated example, the subscriber circuits 215a and 215b are connected to the subscriber terminals 25a and 25b through the subscriber lines 26a and 26b and are connected to both the switch 211 and the control signal receiving section 214 which is also connected to the packet switching network 23 through the control signal line 27.

With this structure, control signals which may be called subscriber control signals are sent from the subscriber terminals 25a and 25b to the subscriber circuits 215a and 215b through the subscriber lines 26a and 26b, respectively, and to the control signal receiving section 214. The subscriber control signals may include connection control signals which are indicative of connections between the subscriber terminals 25a and 25b and the video servers 20a and 20b to transmit video signals and which are indicative of connections or disconnections for control signal transmission.

Supplied with the above-mentioned connection control signals, the control signal receiving section 214 transfers the same to the connection controller 213 which is operable in accordance with a connection control protocol. The connection controller 213 processes the connection control signals on the basis of the connection control protocol to exchange the connection control signals with the video servers 20a and 20b.

Specifically, connections between the subscriber terminals 25a and 25b and the video servers 20a and 20b are realized for video signal transmission by changing parameters of the switch 211 necessary for connections and disconnections from one to another. On the other hand, connections between the subscriber terminals 25a and 25b and the video servers 20a and 20b are established for control signal transmission by controlling the packet switching network 23 on the basis of processed results of the connection control signals.

Thus, video signals are transmitted from the video servers 20a and 20b to the subscriber terminals 25a and 25b through the video signal transmission paths 22a and 22b, the switch 211, and the subscriber circuits 215a and 215b. The subscriber control signals, such as the connection control signals, are multiplexed by the control signal receiving section 214 and are thereafter sent to the video servers 20a and 20b through the control signal line 27 and the packet switching network 23.

Figure 2:
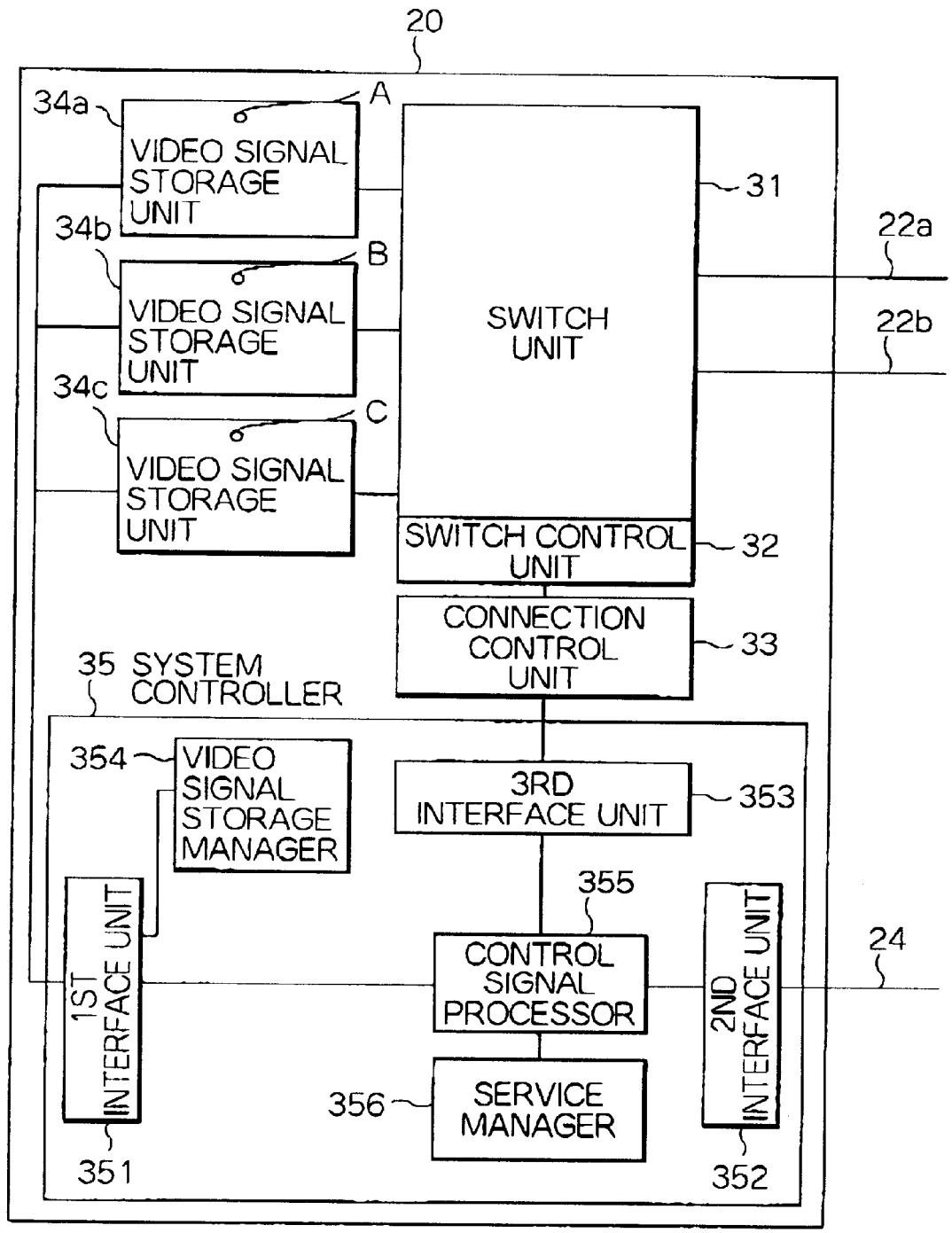
FIG. 2 is a block diagram for use in describing a conventional video server.

Referring to FIG. 2 together with FIG. 1, a conventional video server which may be used as each of the video servers 20a or 20b and which is depicted at 20 in FIG. 2 is connected through the video signal transmission paths 22a and 22b to the exchange 21 (FIG. 1) and through the control signal path 24 to the packet switching network 23 (FIG. 1).

The illustrated video server 20 comprises a switch unit 31 connected to the video signal transmission paths 22a and 22b, a switch control unit 32, a connection control unit 33, and a plurality of video signal storage units which are specified by three storage units 34a, 34b, and 34c in FIG. 2. In addition, the video signal storage units 34a to 34c and the connection control unit 33 are controlled by a system controller 35 in a manner to be described later in detail.

The illustrated system controller 35 includes a first interface unit 351 connected to the video signal storage units 34a to 34c, a second interface unit 352 connected to the control signal transmission path 24, and a third interface unit 353 connected to the connection control unit 33. In the system controller 35, a video signal storage unit manager 354 is connected to the first interface unit 351 while a control signal processor 355 is located between the first, the second, and the third interface units 351, 352, and 353 and is connected to a service manager 356.

In the example being illustrated, the subscriber control signals are sent through the control signal transmission path 24 and the second interface unit 352 to the control signal processor 355. When the subscriber control signals are concerned with control operation of the switch unit 31, the control signal processor 355 sends the subscriber control signals to the connection control unit 33 through the third interface unit 353.

In addition, the control signal processor 355 monitors or manages directory signals representative of locations and species of video programs in the video signal storage units 34a to 34c. Supplied with a reproduction or readout control signal as the subscriber control signals, the control signal processor 355 transfers the same to the video signal storage units 34a to 34c through the first interface unit 351.

On the other hand, the service manager 356 manages service information at each of the subscriber terminals on the basis of the control signals sent from the control signal processor 355. The service information is related to the status of requests, a video program currently reproduced, the status of issuing reproduction or readout commands by a subscriber, and service information (specifies desirable programs) requested by a subscriber In addition, the video signal storage manager 354 manages or administers the video signal storage units 34a, 35b, and 34c via the first interface unit 351 to check a utilization rate of resources, such as the video signal storage units 34a to 34c, a disk storage (not shown), an input/output interface (not shown also), the number of video streams reproduced and sent, and a transmission rate of the video streams.

For example, it is assumed that video programs A, B, and C be stored in the video signal storage units 34a, 34b, and 34c, respectively, as designated in FIG. 2 and that that each of the video programs A, B, and C can be reproduced and read out of the video signal storage units 34a, 34b, and 34c as reproduced video programs and transferred from the video server 20 to the subscriber terminals 25a and 25b.

At first, let the video program A be transmitted from the video server 20 to the subscriber terminal 25a in response to the request for the video program A sent from the subscriber terminal 25a. In this event, the control signal processor 355 is supplied from the subscriber terminal 25a through the second interface unit 352 with the control signal indicative of selection of the video program A. Responsive to the control signal, the control signal processor 355 confirms with reference to the directory information that the video program A is stored in the video signal storage unit 34a.

When the connection between the exchange 31 and the subscriber terminal 25a is established in the manner mentioned in conjunction with FIG. 1, the control signal processor 355 indicates to the connection control unit 33 through the third interface unit 353 that the video signal storage unit 34a is to be connected to the video signal transmission path 22a. Supplied with the indication from the control signal processor 355, the connection control unit 33 at first checks connection states between the video signal storage units 34a to 34c and the video signal transmission paths 22a and 22b and thereafter judges whether or not the video signal storage unit 34a can be connected to the video signal transmission path 22a. If the connection is possible between the video signal storage unit 34a and the video signal transmission path 22a, the switch 31 is driven to connect the video signal storage unit 34a to the video signal transmission path 22a under control of the connection control unit 33 and the switch control unit 32.

After a connection path is formed between the video signal storage unit 34a and the video signal transmission path 22a, the connection control unit 33 reports formation of the connection path to the control signal processor 355 through the third interface unit 353. Reporting the formation of the connection path, the control signal processor 355 instructs the video signal storage unit to be kept as a resource necessary for reproducing the video program A.

If the video program A can be reproduced, the video signal storage unit 34a reports to the control signal processor 355 about this fact. In reply to the formation of the connection and the report on reproducibility of the video program A from the connection control unit 33 and the video signal storage unit 34a, the control signal processor 355 notifies the subscriber terminal 25a of the reproducibility of the video program A. Such a notification is sent to the subscriber terminal 25a in the form of the control signal.

Responsive to the control signal representative of the reproducibility of the video program A, the subscriber terminal 25a produces a reproduction control command which corresponds to a "PLAY" command in a video cassette recorder. The reproduction control command is sent from the subscriber terminal 25a to the control signal processor 355 through the control signal path 24 and the second interface unit 352.

Responsive to the reproduction control command, namely, the "PLAY" command, the control signal processor 355 transfers the reproduction control command to the video signal storage unit 34a. As a result, the video signal storage unit 34a starts reproducing the video program A which is sent in the form of a video signal to the subscriber terminal 25a through the switch 31 and the video signal transmission path 22a.

Herein, description will be made about a control procedure which is carried out during reception of the video program A of the subscriber terminal 25a when control commands except the "PLAY" command are given from the subscriber terminal 25a. Specifically, a "PAST-FORWARD" command, a "FAST-REWIND" command, a "PAUSE" command are assumed to be sent from the subscriber terminal 25a which is receiving the video program A. It is to be noted that such control commands, such as the "FAST-FORWARD" command, the "FAST-REWIND" command, the "PAUSE" command, never require a transmission service of a video program and may therefore be called either specific reproduction control commands or exceptional commands.

Supplied with the above-mentioned exceptional commands from the subscriber terminal 25a through the control signal path 24, the control signal processor 355 transfers the exceptional commands to the video signal storage unit 34a to operate the video signal storage unit 34a in accordance with the exceptional commands.

The following description will be directed to a switching procedure for switching the video program A to the video program C in response to a switching command sent from the subscriber terminal 25a. Herein, it is assumed that the control signal processor 355 is supplied through the second interface unit 352 from the subscriber terminal 25a as the control signal with a switching control signal which is indicative of switching the video program A to the video program C stored in the video signal storage unit 34c. In this case, the control signal processor 355 indicates a pause or temporary interruption of the video program A to the video signal storage unit A through the first interface unit 351. As a result, the video signal storage unit 34a stops reproducing the video program A. On the other hand, the control signal processor 355 confirms that the video program C in question is stored in the video signal storage unit 34c.

After confirming the storage of the video program C in the video signal storage unit 34c, the control signal processor 355 controls the connection control unit 33 through the third interface unit 353 so that the connection path is disconnected or released between the video signal storage unit 34a and the video signal transmission path 22a and, instead, a new connection path is formed between the video signal storage unit 34c and the video signal transmission path 22a. Practically, the connection control unit 33 at first detects connection states between the video signal storage units 34a to 34c and the video signal transmission paths 22a and 22b and judges whether or not the new connection path is formed between the video signal storage unit 34c and the video signal transmission path 22a. Thereafter, the connection control unit 33 drives the switch control unit 32 with reference to the result of judgement. In the illustrated example, the new connection path is assumed to be formed between the video signal storage unit 34c and the video signal transmission path 22a. In this case, the connection control unit 33 reports to the control signal processor 355 through the third interface unit 353 that the new connection path is formed between the video signal storage unit 34c and the video signal transmission path 22a in the switch unit 31. On reception of the above-mentioned report, the control signal processor 355 indicates the video signal storage unit 34c is to be held as a resource for reproducing the video program C.

When the video program C is reproduced by the video signal storage unit 34c, the video signal storage unit 34c reports to the control signal processor 355 that the video program C can be reproduced in the video signal storage unit 34c.

Responsive to the formation of the new connection path and the reproducibility of the video program C, the control signal processor 355 notifies the subscriber terminal 25a that the video program A is switched to the video program C. Such a notification of switching the video program A to the video program C is received as a control signal by the subscriber terminal 25a.

Supplied with the above-mentioned notification, the subscriber terminal 25a produces the reproduction control command corresponding to the "PLAY" command and transmits the same to the control signal processor 355 through the control signal transmission path 24 and the second interface unit 352. The "PLAY" command is transferred from the control signal processor 355 to the video signal storage unit 34c through the first interface unit 351. The resultant video signal storage unit 34c starts reproducing the video program C and sends the video program C in the form of a video signal or a reproduced video program to the subscriber terminal 25a.

Thus, the video programs A to C are switched from one to another in the above-mentioned manner.

The illustrated video server 20 executes the reproduction control commands, such as the "PLAY", "FAST-FORWARD", "FAST-REWIND", "PAUSE", and "SWITCH" commands and is however disadvantageous as mentioned in the preamble of the instant specification.

Figure 3:
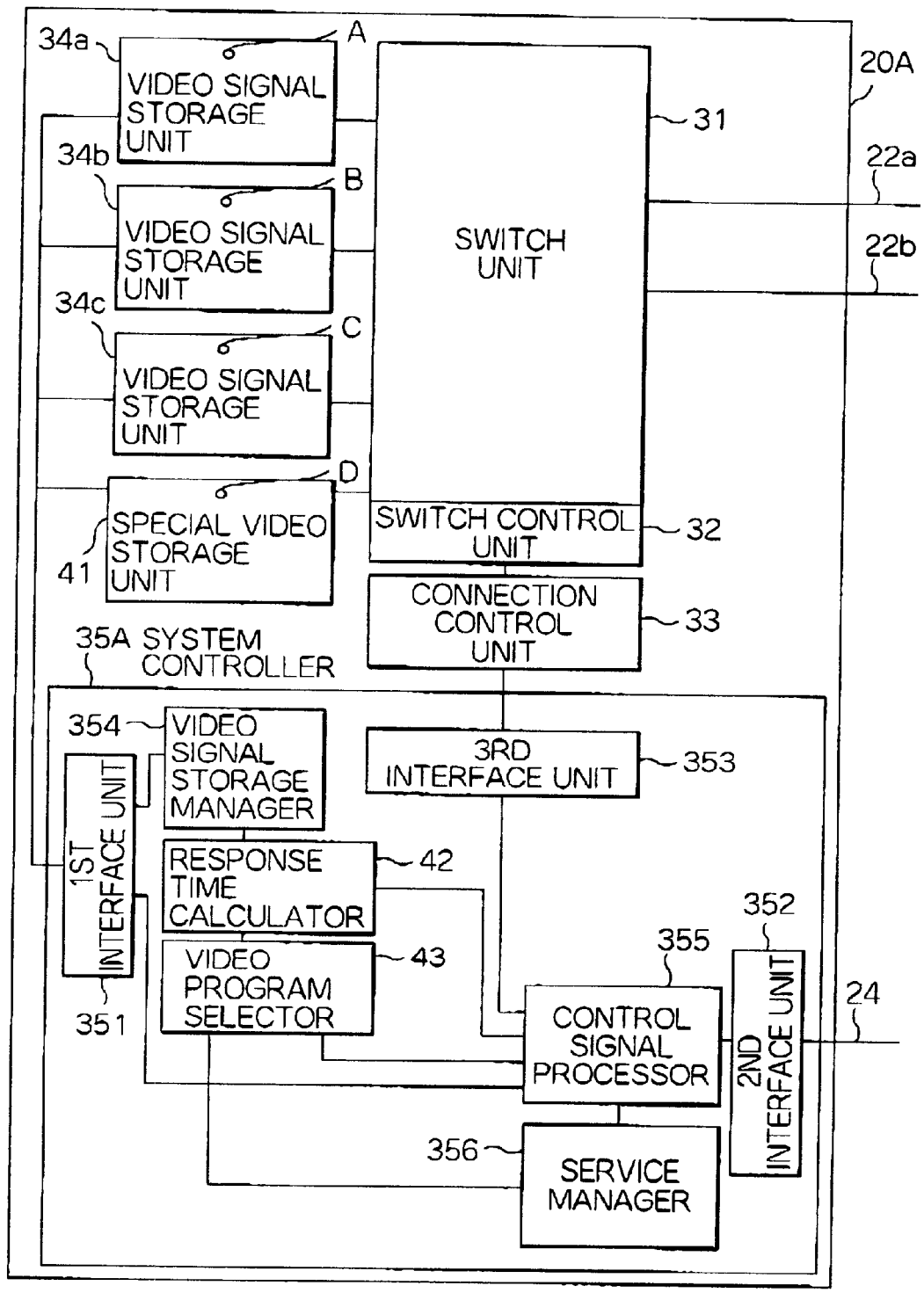
FIG. 3 is a block diagram of a video server according to a first embodiment of this Invention.

Referring to FIG. 3, a video server 20A according to a first embodiment of this invention is similar in structure and operation to that illustrated in FIG. 2 except that a special video storage unit 41 is connected to the switch unit 31 together with the video signal storage units 34a to 34c and that a response time calculator 42 and a video program selector 43 are included in the system controller depicted at 35A. The illustrated system controller 35A may be referred to as a control circuit operable in a manner to be described later As shown in FIG. 3, the special video storage unit 41 is coupled through the first interface unit 351 to the control signal processor 355. On the other hand, the response time calculator 42 is connected to the video signal storage manager 354, the control signal processor 355, and the video program selector 43 and is operable in a manner to be described later in detail while the video program selector 43 connected to the response time calculator 42 is connected to the control signal processor 355 and the service manager 356 and is also operable in a manner to be mentioned later.

Herein, it is to be noted that the special video storage unit 41 is operable at a high speed in comparison with the other video signal storage units 34a to 34c and may store a plurality of special video programs given by a service supplier or so. Such each special program is quickly reproduced or read out of the special video storage unit 41 as a reproduced special video program within an extremely short time as compared with the other video signal storage units 34a to 34c.

Furthermore, the response time calculator 42 calculates or measures a response time from a reception time of a request to a start of reproduction of a video program requested. At any rate, no video program or signal is transmitted from the video server 20A to the subscriber terminal 25a or 25b within the response time. The response time may therefore be referred to as a nontransmission time or an idle time.

Specifically, the response time calculator 42 is operated in response to an indication sent from the control signal processor 355 and monitors utilization states of the resources, such as each disk storage and disk input/output interface of the video signal storage units 34a to 34c, the number of video streams currently reproduced and transmitted, and the transmission rate, all of which are monitored by the video signal storage manager 354. As a result, the response time calculator 42 calculates the response time and notifies the video program selector 43 of the response time calculated by the response time calculator 42.

The video program selector 43 receives the response time and selects one of the special video programs that can be transmitted within the response time calculated by the response time calculator 42. If it is judged by the video program selector 43 that the response time is extremely short such that none of the special programs can be transmitted, the video program selector 43 stops selecting the special video programs. On the other hand, if a plurality of the special video programs can be transmitted within the response time, the video program selector 43 selects such special video programs in the order of priorities predetermined by a service supplier or provider.

At any rate, the special programs can be transmitted within the response time and be forcibly watched by viewers of the subscriber terminals 25a and 25b. To this end, the video program selector 43 searches service information which is managed by the service manager 356 and which is prepared at every one of the subscriber terminals 25a and 25b. On the basis of the result of the above-mentioned search, the video program selector 43 prepares, at every one of the subscriber terminals 25a and 25b, candidates of the special video programs which can be transmitted within the response time and thereafter selects one of the candidates When decision is made in the video program selector 43 about one of the special video programs that is to be transmitted, the result of decision is sent to the control signal processor 355.

If the selected special video program to be transmitted is notified, the control signal processor 355 informs the connection control unit 33 of a connection request between the special program storage unit 41 and the video signal transmission path, such as 22a and 22b.

When a connection is formed between the special program storage unit 41 and the video signal transmission path in the manner mentioned in conjunction with FIG. 2, the control signal processor 355 instructs the special video storage unit 41 through the first interface unit 351 to start reproducing the selected special video program.

After completion of the selected special program within the response time, the special video storage unit 41 notifies the control signal processor 355 of the completion of the selected special video program Supplied with the completion of the selected special video program, the control signal processor 355 transmits a previous connection request sent from the subscriber terminal 25a or 25b, to the connection control unit 33 through the third interface unit 353 in accordance with the above-mentioned procedure.

In addition, the control signal processor 355 informs the subscriber terminal 25a or 25b of the reproducibility of the video program requested in the manner mentioned in conjunction with FIG. 2.

More specifically, it is assumed that the video programs A, B, and C are stored in the video signal storage units 34a, 34b, and 34c while a special video program depicted at D is stored in the special video storage unit 41. Under the circumstances, let the video program A be requested by the subscriber terminal 25a.

In this event, the illustrated video server 20A at first sends the special video program D to the subscriber terminal 25a before lapse of the response time and thereafter sends the video program A after transmission of the special program D. For this purpose, the special video storage unit 41 is switched to the video signal storage unit 34a in a following manner Herein, it is assumed that a connection has been already established between the subscriber terminal 25a and the video signal transmission path 22a through the switch 211 of the exchange 21 in the manner mentioned with reference to FIG. 1.

Supposing that the request for the video program A is given as the control signal from the subscriber terminal 25a through the control signal transmission path 34 and the second interface unit 352 to the control signal processor 355. Supplied with the request for the video program A as the control signal, the control signal processor 355 notifies the response time calculator 42 of reception of the request for the video program A. The response time calculator 42 calculates a response time required until the video program A is read out or reproduced, with reference to the utilization state or picture of the resources managed by the video signal storage manager 354 and the states of the video streams. The calculated response time is delivered from the response time calculator 42 to the video program selector 43.

The video program selector 43 judges whether or not any video program can be sent to the subscriber terminal 25a within the calculated response time.

If none of the video programs are reproduced within the calculated response time, the video program selector 43 stops selecting the video programs and notifies the control signal processor 355 of stoppage of the selection of the video programs. Thereafter, the video program A is reproduced after lapse of the response time in accordance with the above-mentioned procedure and is sent to the subscriber terminal 25a.

On the other hand, if the special video program D can be reproduced within the response time, the video program selector 43 notifies the control signal processor 355 of reproducing the special video program D within the response time. In this case, the control signal processor 355 supplies the connection control unit 33 with a connection request representative of a connection between the video signal transmission path 22a and the special video storage unit 41 storing the special video program D. In this case, the connection request which is representative of selection of the special video program D may be called a selection signal to select the special video program D. The connection control unit 33 serves to connect the special video storage unit 41 to the video signal transmission path 22a in response to the selection signal which is given as a connection control signal.

When the connection is established between the video signal transmission path 22a and the special video storage unit 41, the control signal processor 355 instructs start of the reproduction of the special program D to the special video storage unit 41 through the first interface unit 351. When transmission of the special video program D is finished or completed within the response time, the special video storage unit 41 informs the control signal processor 355 through the first interface unit 351 of completion of the transmission.

In addition, the control signal processor 355 notifies the connection control unit 33 of the request for connection between the video signal transmission path 22a and the video signal storage unit 34a through the third interface unit 353. The connection control unit 33 connects the video signal transmission path 22a to the video signal storage unit 34a in the manner mentioned in conjunction with FIG. 1 and, as a result, establishes a connection path through the switch unit 31.

In this event, the control signal processor 355 informs the subscriber terminal 25a through the control signal path 24 that the video program can be reproduced by the video signal storage unit 34a. Subsequently, the video program A is sent from the video signal storage unit 34a to the subscriber terminal 25a through the switch unit 31 and the video signal transmission path 22a.

Thus, the illustrated video server 20A calculates the response time required until the transmission of the video program requested by each of the subscriber terminals 25a and 25b and reproduces, within the response time, the special video program or programs different from the video program requested by the subscriber terminal 25a or 25b. After completion of the special video program or programs, the video program requested is transmitted.

Within the response time, the special video program or programs D have been transmitted from the special video storage unit 41 alone. However, such a special video program may be transmitted from the other special video storage unit or units than the illustrated special video storage unit.

Figure 4:
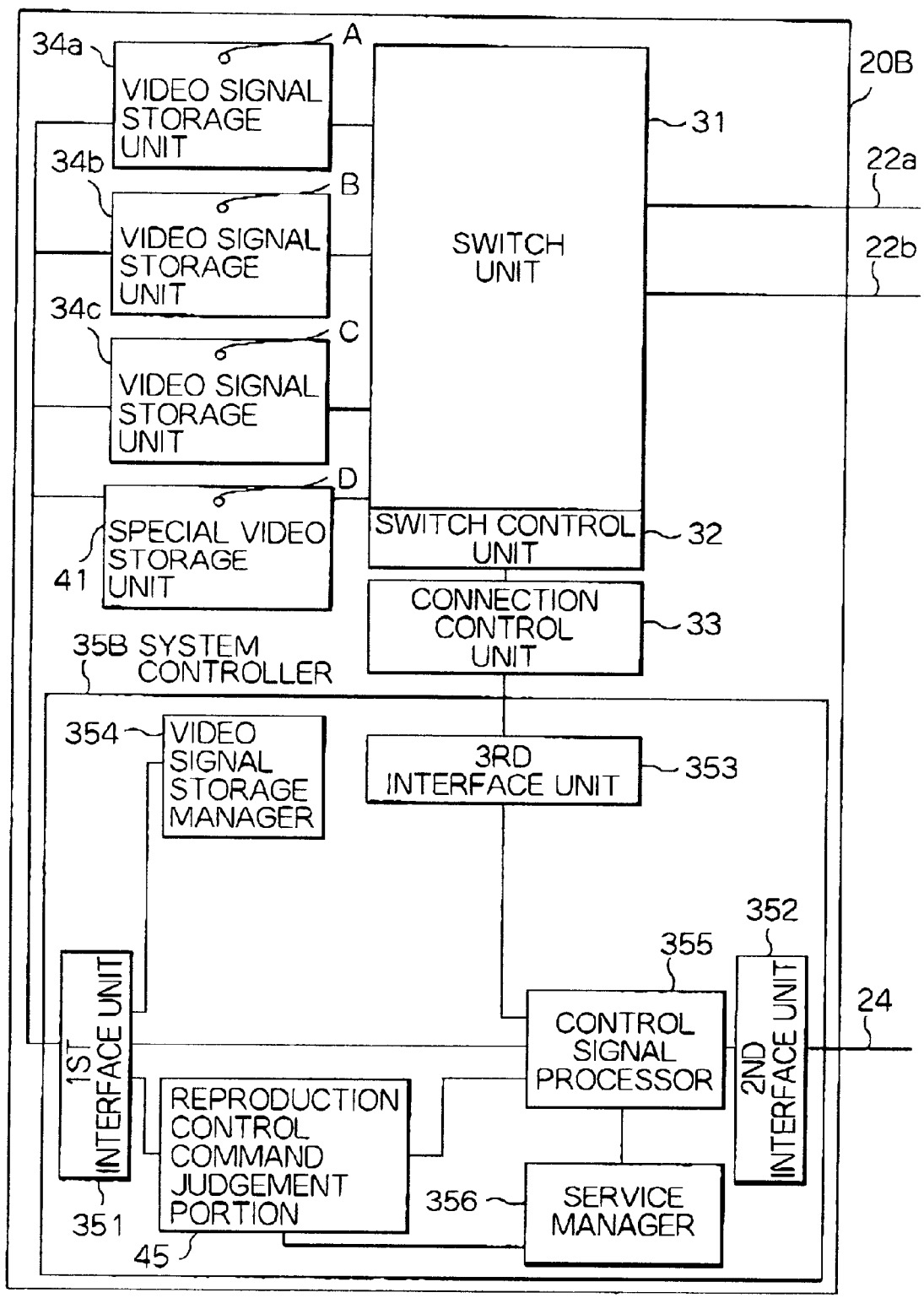
FIG. 4 is a similar diagram of a video server according to a second embodiment of this invention.

Referring to FIG. 4, a video server 20B according to a second embodiment of this invention is similar to that illustrated in FIG. 2 except that a reproduction control command judgment portion 45 is included in the Illustrated system controller 35B. The special video storage unit 41 is included in the illustrated video server 20B like in FIG. 3. In addition, it is assumed like in FIG. 3 that the video signal storage units 34a, 34b, and 34c store the video programs A, B, and C, respectively, while the special vide storage unit 41 also stores the special video program D and can quickly read out or reproduce the special video program D in comparison with the remaining video signal storage units 34a to 34c. On the other hand, the reproduction control command judgment portion 45 is operable in a manner to be described later in detail.

In the illustrated example, the control signal is suppled from each of the subscriber terminals 25a and 25b to the control signal processor 355 through the control signal transmission path 24 and the second interface unit 352 in the manner mentioned before in conjunction with FIG. 3. The control signal processor 355 judges whether or not the control signal is concerned with connection control between the video signal storage units, such as 34a to 34c, and 41 and the video signal transmission paths 22a and 22b. The control signal which is concerned with the connection control is sent through the third interface unit 353 to the connection control unit 33.

Under the circumstances, when a video program reproduction command is given as the control signal from the subscriber terminals 25a and 25b, the control signal processor 355 monitors the directory information in response to the video program reproduction command on one hand and sends the video program reproduction command to the reproduction control command judgment portion 45 The directory information indicates the locations of the video programs, such as A to D, and species or contents of the video programs.

Supplied with the video program reproduction command, the reproduction control command judgment unit 45 interrogates the service manager 356 about a current video program which is now being watched by the subscriber terminal, for example, 25a.

After interrogating the service manager 356, the reproduction control command judgment unit 45 detects whether or not the special video program D is being received by the subscriber terminal 25a. When the special video program D is not received by the subscriber terminal 25a, the reproduction control command judgement portion 45 judges the reproduction control command to be valid or effective. Thereafter, the reproduction control command is transferred from the reproduction control command judgment unit 45 to the video signal storage unit 34a through the first interface unit 351 to execute the reproduction control command.

On the other hand, it is judged by the reproduction control command judgment portion 45 that the reproduction control command is invalid when the special video program D is being received by the subscriber terminal 25a. In this case, the reproduction control command is not transferred from the reproduction control command judgment portion 45 to the special video storage unit 41. As a result, the reproduction control command is not executed when the special video program is received by the subscriber terminal 25a or 25b which has issued the reproduction control command.

Although the above description has been made about the subscriber terminal 25a, similar operation is also carried out in connection with the subscriber terminal 25b.

Herein, it is to be noted that the special video program D judged by the reproduction control command judgment portion 45 may be, for example, advertisement or commercial information, preview information of a movie, and the like, which has previously been selected by a service provider or given by a sponsor.

More specifically, it is assumed that the subscriber terminal 25a is receiving the video program A sent from the video signal storage unit 34a while the subscriber terminal 25b Is receiving the special video program D from the special video storage unit 41. In this event, it is also assumed that the reproduction control command judgment portion 45 judges the reproduction control command to be invalid while the special video program D stored in the special video storage unit 41 is being received by each subscriber terminal.

Under the circumstances, let the reproduction control command judgment portion 45 receive the reproduction control command from the subscriber terminal 25a. The reproduction control command judgment portion 45 interrogates the service manager 356 about a current video program which is now being received by the subscriber terminal 25a. As a result of the interrogation, when it is recognized by the reproduction control command judgment portion 45 that the video program A is being received as the current video program by the subscriber terminal 25a, the reproduction control command judgment portion 45 judges the reproduction control command to be valid. Thereafter, the valid reproduction control command is transferred through the first interface unit 351 to the video signal storage unit 34a which is indicated by the control signal processor 355. Thus, reproduction control is effectively made about the video program A.

On the other hand, when the reproduction control command is received from the subscriber terminal 25b, the reproduction control command judgment portion 45 interrogates the service manager 356 about a current video program which is now being received by the subscriber terminal 25b. When it is detected that the subscriber terminal 25b is receiving the special video program D, the reproduction control command judgment portion 45 judges the reproduction control command to be invalid and notifies the control signal processor of the invalidity of the reproduction control command sent from the subscriber terminal 25b. Responsive to this notification from the reproduction control command judgment portion 45, the control signal processor 355 notifies the subscriber terminal 25b that the reproduction control command in question can not be now executed. As a result, the special video program D is forcibly transmitted to the subscriber terminal 25b without interruption.

As mentioned before, judgment is made about validity or invalidity of the reproduction control command after the reproduction control command judgment portion 45 interrogates the service manager 356 about the current video program which is now being received by each of the subscriber terminals, such as 25a and 25b. In other words, the reproduction control command from the subscriber terminals, such as 25a and 25b, can be controlled or monitored at every video program.

In addition, a service provider may voluntarily decide transmission times of the reproduction control command sent from the subscriber terminal 25a or 25b. With this structure, the reproduction control command judgment portion 45 can restrict, at every video program, the transmission times of each reproduction control command assigned to the subscriber terminal 25a or 25b.

Figure 5:
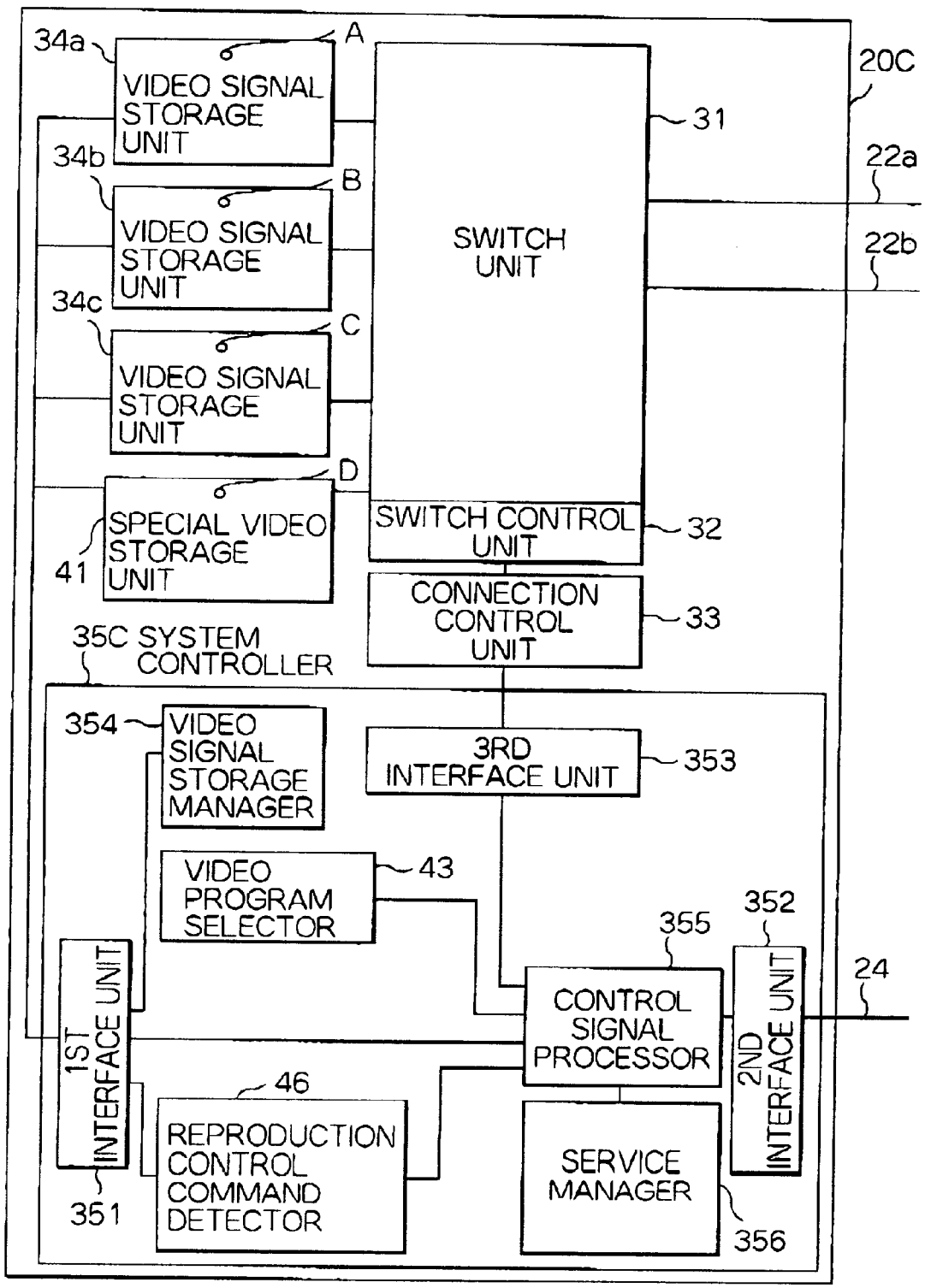
FIG. 5 is a block diagram of a video server according to a third embodiment of this invention.

Referring to FIG. 5, a video server 20C according to a third embodiment of this invention is similar in structure to that illustrated in FIG. 4 except that a video program selector 43 and a reproduction control command detector 46 are included in a system controller 35C. It is noted that the reproduction control command detector 46 is somewhat different from the reproduction control command judgment portion 45 illustrated in FIG. 4, as will become clear later.

The reproduction control command detector 46 Is connected to both the control signal processor 355 and the first interface unit 351. Like in FIGS. 3 and 4, the control signal is delivered from the subscriber terminal 25a or 25b to the control signal processor 355 through the second interface unit 352. The control signal processor 355 sends the control signal to the connection control unit 33 through the third interface unit 353 when the control signal is concerned with the connection control of the switch unit 31, as mentioned before.

Moreover, the control signal processor 355 manages the directory information to detect the locations and the species of the video programs stored in the video signal storage units 34a to 34c and the special video storage unit 41. With this structure, when the control signal is concerned with reproduction control of the video programs stored in the video signal storage units 34a to 34c and the special video storage unit 41, the control signal processor 355 supplies the reproduction control command detector 46 with the control signal with reference to the directory information. In this case, such a control signal may be called a reproduction control command.

When the reproduction control command is not indicative of a specific reproduction command predetermined by the service provider, the reproduction control command detector 46 sends the reproduction control command to the video signal storage units 34a to 34c or the special video storage unit 41. Furthermore, the reproduction control command is delivered as a notification signal to the control signal processor 355 to switch, to the other video programs, the video programs which are being currently received by the subscriber terminals 25a and 25b.

Supplied with the notification signal from the reproduction control command detector 46, the control signal processor 355 drives the video program selector 43 to make the same decide a program or programs to be sent during execution of the reproduction control command to the subscriber terminals 25a and 25b among the special video programs stored in the special video storage unit 41. Such program or programs decided by the video program selector 43 may be referred to as a decided program. When decision Is made about the decided program which is to be transmitted during execution of the reproduction control command, the video program selector 43 informs the control signal processor 355 of the decided program.

Responsive to a notification of the decided program to be transmitted during execution of the reproduction control command, the control signal processor 355 supplies the connection control unit 33 through the third interface unit 353 with a connection request between the special video storage unit 41 and one of the video signal transmission paths 22a and 22b. Thereafter, the connection Is established in the switch unit 31 between the special video storage unit 353 and one of the video signal transmission paths 22a and 22b in the manner mentioned before. Subsequently, the control signal processor 355 Indicates start of the reproduction to the special video storage unit 41.

More particularly, let the subscriber terminal 25a receive the video program A stored In the video signal storage unit 34a and transmit the reproduction control command during reception of the video program A. In the illustrated example, the video program A is switched to the special program D during execution of the specific reproduction control command. Herein, it is assumed that the connection path Is established between the subscriber terminal 25a and the video signal transmission path 22a through the switch 211 of the exchange 21 (FIG. 1) and that the connection path is also established through the switch 31 between the video signal storage unit 34a and the video signal transmission path 22a.

Under the circumstances, let the reproduction control command specify the specific reproduction control command, such as the "FAST-FORWARD", the "FAST-REWIND" command. At first, when the "FAST-FORWARD" command is sent as the specific reproduction control command from the subscriber terminal 25a and is detected by the reproduction control command detector 46, the control signal processor 355 is informed of reception of the "FAST-FORWARD" command from the reproduction control command detector 46. The control signal processor 355 instructs the video program selector 43 to select the special video program D stored in the special video storage unit 41. When the special video program D is selected by the video program selector 43, selection of the special video program D is notified from the video program selector 43 to the control signal processor 355.

When the above-mentioned notification is received by the control signal processor 355 during execution of the "FAST-FORWARD" command, the control signal processor 355 issues a connection request to the connection control unit 33 through the third interface unit 33. In this case, the connection request indicates to form a connection path between the special video storage unit 41 and the video signal transmission path 22a.

In any event, when the connection path is formed between the special video storage unit 41 and the video signal transmission path 22a, the control signal processor 355 instructs the special video storage unit 41 to start reproducing the special video program D.

Similar operation can be made on reception of the "FAST-REWIND" command sent from the subscriber terminal 25a or 25b.

Thus, the special video program can be transmitted from the special video storage unit 41 to the subscriber terminal 25a or 25b during execution of the specific reproduction control command, such as "FAST-FORWARD", "FAST-REWIND" command. Therefore, the special program can not be overlooked by viewers of each subscriber terminal.

After execution of the specific reproduction control command, the special video program D is switched or restored to a previous or normal video program A In a manner to be described later.

Supposing that the reproduction control command detector 46 detects another predetermined reproduction control command, such as a "PLAY" command, except the specific reproduction control command, such as "FAST-FORWARD" and "FAST-REWIND" sent from the subscriber terminal 25a to the video signal storage unit 34a while the special video program D is being received by the subscriber terminal 25a. In this event, the reproduction control command detector 46 notifies the control signal processor 355 so that the special video program D is to be switched or returned to the video program A. Responsive to the notification, the control signal processor 355 produces an indication of a connection between the video signal transmission path 22a and the video signal storage unit 34a. The indication of the connection between the video signal transmission path 22a and the video signal storage unit 34a is sent through the third interface unit 353 to the connection control unit 33.

The connection control unit 33 forms a connection path between the video signal transmission path 22a and the video signal storage unit 34a in the switch unit 31 in the manner described before. After the connection path in the switch unit 31 is formed, the reproduction control command detector 46 makes the special video storage unit 41 stop reproducing the special video program D and sends the "PLAY" command of the video program A to the video signal storage unit 34a. Thus, the video program A is reproduced from the video signal storage unit 34a and sent to the subscriber terminal 25a.

Alternatively, the special video program D may be switched or restored to the video program A in a manner which is different from the above. Specifically, when the predetermined reproduction control command (such as "PLAY" command) except the "FAST-FORWARD", "FAST-REWIND", is detected by the reproduction control command detector 46, the reproduction control command detector 46 notifies the control signal processor 355 so that the special video program D of the subscriber terminal 25a is returned back or switched to the video program A.

When the control signal processor 355 receives the notification of switching the special video program D to the video program A and completion of the reproduction of the special video program D from the special video storage unit 41 through the first interface unit 351, a connection request is sent from the control signal processor 355 to the connection control unit 33 through the third interface unit 353 to connect the video signal storage unit 34a to the video signal transmission path 22a.

After a connection path is formed between the video signal storage unit 34a and the video signal transmission path 22a in the switch unit 31, the reproduction control command detector 46 makes the special video storage unit 41 stop reproducing the special video program D and transmits the video signal storage unit 34a to the "PLAY" command of the video program A Thus, the video program A is transmitted to the subscriber terminal 25a through the switch unit 31.

With this structure, when the specific reproduction control command is produced by the subscriber terminal 25a or 25b and detected by the reproduction control command detector 46, the video program is switched to another video program in the subscriber terminal which produces the specific reproduction control command.

Moreover, the first through the third embodiments may be combined together in a manner to be described later in detail.

Figure 6:
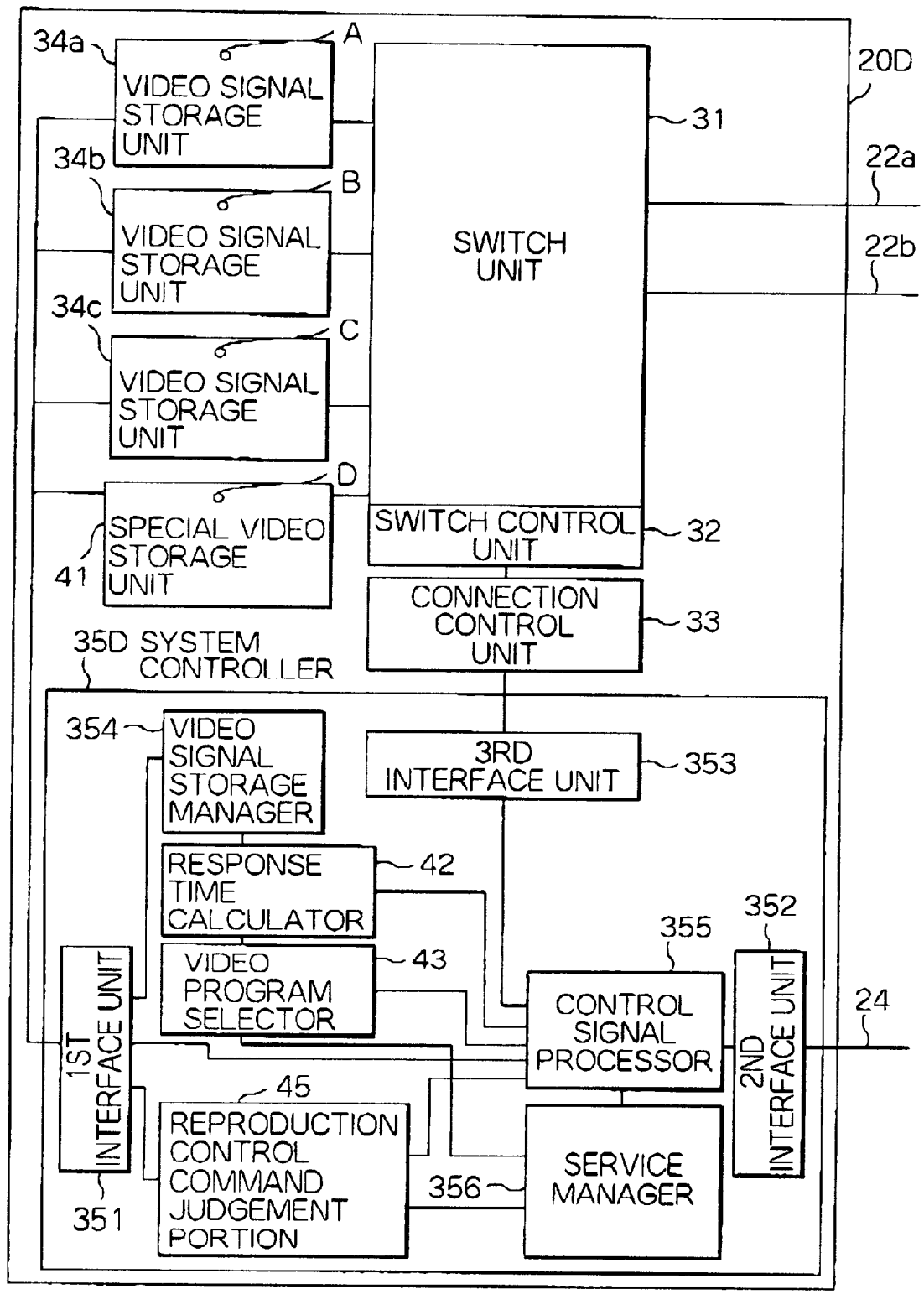
FIG. 6 is a block diagram of a video server according to a fourth embodiment of this invention.

Referring to FIG. 6, a video server 20D according to a fourth embodiment of this invention comprises a system controller 35D which is substantially equivalent to a combination of those illustrated in FIGS. 3 and 4. Specifically, the system controller 35D comprises a response time calculator 42, a video program selector 43, and a reproduction control command judgment portion 45 which are similar in structure and operation to those illustrated in FIGS. 3 and 4. In addition, the first through the third interface units 351 to 353, the video signal storage manager 354, the control signal processor 355, and the service manager 356 are included in the system controller 35D, like in FIGS. 3 and 4.

With this structure, when each of the subscriber terminal 25a and 25b issues a request for a certain video program, for example, the video program A to the video server 20D, the response time calculator 42 calculates a response time spent until transmission of the video program A to select, by the video program selector 43, the special video program or programs D that can be transmitted within the response time and that may be sent as a selected special program from the special video storage unit 41 through the switch unit 31 to the subscriber terminal 25*a*.

After completion of the selected special program, the special video storage unit 41 is switched under control of the connection control unit 33 to the video signal storage unit 34*a* which stores the video program A requested by the subscriber terminal 25*a*.

Moreover, when the reproduction control command is sent from the subscriber terminal, for example, the subscriber terminal 25*a* and received as the control signal by the reproduction control command judgment portion 45 through the control signal processor 355, the reproduction control command judgment portion 45 interrogates the service manager 356 about the video program which is being currently received by the subscriber terminal 25*a*. Thereafter, the reproduction control command judgment portion 45 judges whether the reproduction control command is valid or invalid in a manner similar to that illustrated in conjunction with FIG. 4. This shows that the reproduction control from the subscriber terminals 25*a* and 25*b* can be controlled at every one of the video programs, as mentioned in connection with FIG. 4. At any rate, the illustrated video server 20D has both merits mentioned with reference to the video servers 20A and 20B illustrated in FIGS. 3 and 4.

Referring to FIG. 7, a video server 20E according to a fifth embodiment of this invention is similar to that illustrated in FIG. 6 except that a reproduction control command detector 46 is is included in a system controller 35E and is substituted in FIG. 7 for the reproduction control command judgment portion 45 illustrated in FIG. 6. The reproduction control command detector 46 is substantially equivalent to that illustrated in FIG. 5 while the remaining units and parts in the video server 20E are similar to those illustrated in FIG. 6.

With this structure, the response time calculator 42 calculates a response time in response to a request sent from each of the subscriber terminals 25*a* and 25*b*, for example, the subscriber terminal 25*a*. Within the response time, the special video program or programs D can be selected as a selected special program from the special video storage unit 41 in cooperation with the video program selector 43, the control signal processor 355, and the service manager 356 in the manner described with reference to FIG. 3. After the selected special program is completely transmitted from the special video storage unit 41, the selected special program D is switched to the video program A stored in the video signal storage unit 34*a* by switching the switch unit 31 under control of the connection control unit 33.

Furthermore, when a specific reproduction control command, such as the "FAST-FORWARD" command, "FAST-REWIND" command, is issued from the subscriber terminal which may be assumed to be the subscriber terminal 25*a* without loss of generality. In this event, it is assumed that such a specific reproduction control command is produced from the subscriber terminal 25*a* during reception of the video program A and is detected by the reproduction control command detector 46. Supplied with the specific reproduction control command, the reproduction control command detector 46 switches the video program A to the special program or programs D during execution of the specific reproduction control command. Thus, the special program or programs D can be sent as a service program from the special video storage unit 41 to the subscriber terminal 25*a* or 25*b* during execution of the specific reproduction control command.

From this fact, it is readily understood that the video server 20E has both advantages described with reference to those mentioned in FIGS. 3 and 5.

Figure 8:
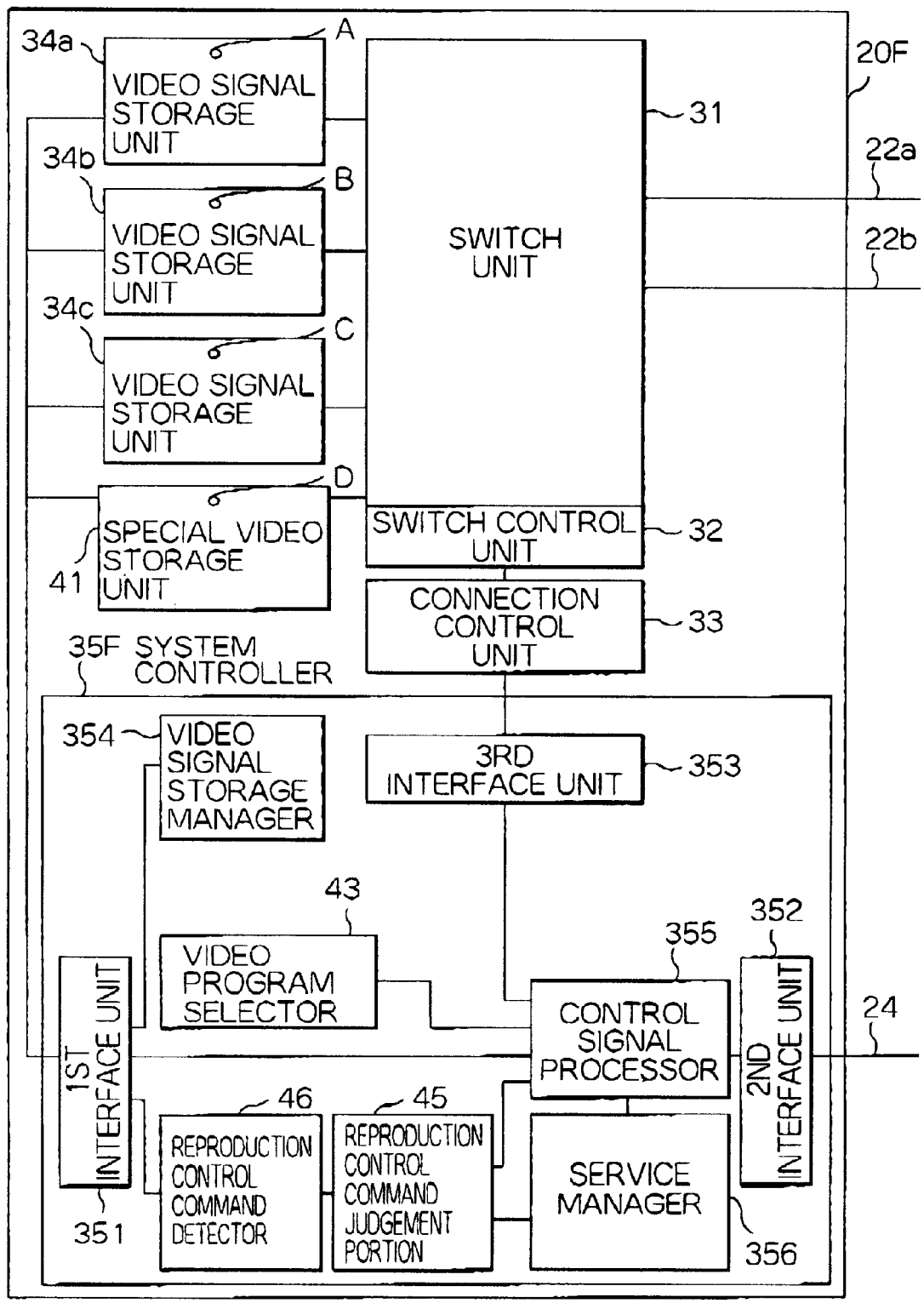
FIG. 8 is a block diagram of a video server according to a sixth embodiment of this invention.

Referring to FIG. 8, a video server 20F according to a sixth embodiment of this invention is similar in structure and operation to a combination of the video servers 20B and 20C illustrated in FIGS. 4 and 5. Like in the other embodiments, the illustrated video server 20F comprises the video signal storage units 34*a* to 34*c* and the special video storage unit 41 together with the switch unit 31, the switch control unit 32, and the connection control unit 33.

Furthermore, the video server 20F comprises both a system controller 35F and a reproduction control command judgment portion 45 and a reproduction control command detector 46 both of which are similar in structure to those illustrated in FIGS. 4 and 5. Specifically, the reproduction control command judgment portion 45 is connected to both the control signal processor 355 and the service manager 356 while the reproduction control command detector 46 is connected to the reproduction control command judgment portion 45 on one hand and to the first interface unit 351 on the other hand.

With this structure, when the subscriber terminal 25*a* is receiving the video program A or the special video program D stored in the video signal storage unit 34*a* and 41, the reproduction control command is sent from the subscriber terminal 25*a*. In this event, the reproduction control command judgment portion 45 interrogates the service manager 356 about a video program which is now being received by the subscriber terminal 25*a*. Thereafter, the reproduction control command judgment portion 45 judges whether the reproduction control command is valid or invalid. This shows that the reproduction control from the subscriber terminals 25*a* and 25*b* can be restricted at every one of the video programs and the special program. Moreover, when the specific reproduction control command is detected by the reproduction control command detector 46 through the reproduction control command judgment portion 45, the reproduction control command detector 46 switches, to the special program D, the video program which is currently being received by the subscriber terminal 25*a*. Therefore, the special video program D can be sent during execution of the specific reproduction control command to the subscriber terminal which transmits the specific reproduction control command.

Therefore, the video server 20F has both merits described in conjunction with the video servers 20B and 20C.

Figure 9:
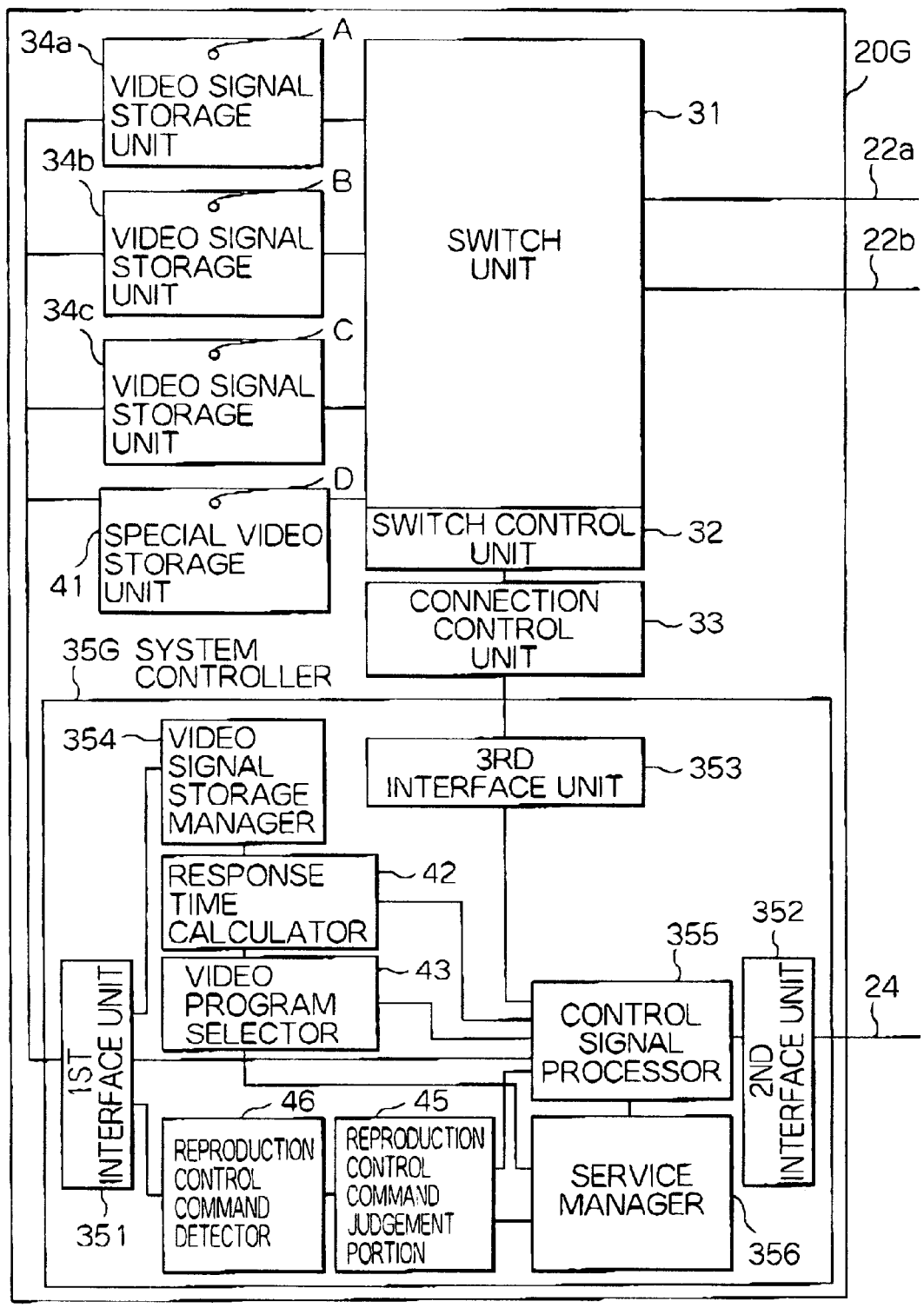
FIG. 9 is a block diagram of a video server according to a seventh embodiment of this invention.

Referring to FIG. 9, a video server 20G according to a seventh embodiment of this invention is similar in structure to that illustrated in FIG. 8 except that a reponse time calculator 42 is included in a system controller 35G and is connected to the video signal storage manager 354, the video program selector 43, and the control signal processor 355. In the illustrated example also, the reproduction control command judgment portion 45 is connected to the control signal processor 355, the service manager 356, and the reproduction control command detector 46 while the reproduction control command detector 46 is connected to both the reproduction control command judgment portion 45 and the first interface unit 351.

With this structure, the response time calculator 42 calculates the response time in response to the request which is issued from the subscriber terminal 25*a* or 25*b* to indicate a reproduction of the video program which may be, for example, A stored in the video signal storage unit 34a. During the reponse time calculated by the response time calculator 42, the special program D is read out of the special video storage unit 41 to be sent to the subscriber terminal 25a or 25b, instead of the requested video program A. After lapse of the response time, the special program D is switched to the requested video program A in the manner described with reference to FIG. 3.

Moreover, when the subscriber terminal which may be, for instance, 25a, is receiving the video program, for example, A and supplies the video server 20G with the reproduction control command during reception of the video program A, the reproduction control command judgment portion 45 interrogates the service manager 356 about the video program A currently received by the subscriber terminal 25a and judges whether the reproduction control command is valid or invalid, as mentioned before. Therefore, the reproduction control from each subscriber terminal can be restricted at every one of the video programs and the special video program. In addition, when the specific reproduction control command is detected by the reproduction control command detector 46, the currently received video program can be forcibly switched to the special program during execution of the specific reproduction control command. Thus, the video server 20G has all of merits described in conjunction with FIGS. 3, 4, and 5.

At any rate, the special program or programs can be transmitted from the special video storage unit 41 to the subscriber terminal 25a and/or 25b within the response time and/or during execution of the specific reproduction control command. Furthermore, such a special program or programs may be transmitted when the reproduction control command is judged to be valid in consideration of the video program which is being received by the subscriber terminal.

While this invention has thus far been described in conjunction with several embodiments thereof, it will be readily possible for those skilled in the art to put this invention into practice In various other manners. For example, various idle times may be used for transmitting a special program to notify viewers of the special program offered by a service provider. The video signal storage units 34a to 34c may not be restricted to a video casette recorders but may be a compact disk or so. In addition, this invention is applicable to a system which includes a single server and a single subscriber terminal.

What is claimed is:

1. A video server for use in delivering a video program to a subscriber terminal in response to a request sent from the subscriber terminal, said video server comprising:

video storage means for storing the video program to produce a reproduced video program representative of the video program;

a special video storage for storing a special video program to produce a reproduced special video program representative of the special video program;

switching means for switching the reproduced video program and the reproduced special video program from one to another in response to a connection control signal to send a selected one of the reproduced video programs and the reproduced special video program to the subscriber terminal;

control means, operable in response to the request, for controlling the video storage means, the special video storage, and the switching means, to produce a selection signal representative of selection of the special program even when the request requires delivery of the video program to the subscriber terminal; and connection signal supply means for supplying the selection signal as the connection control signal to the switching means to make the special video storage transmit the reproduced special video program to the subscriber terminal, the video server being operable in response to a reproduction control command which is directed to the video storage means and the special video storage, the video server further comprising command judging means for judging the reproduction control command received from the subscriber terminal to be valid when the reproduction control command is directed to the video storage means and to be invalid when it is directed to the special video storage.

2. A video server as claimed in claim 1, wherein the special video storage reproduce the special video program at a speed higher than the video storage means.

3. A video server as claimed in claim 1, wherein the control means comprises:

detecting means for detecting a nontransmission time of the reproduced video program required by the request sent from the subscriber terminal;

selecting means coupled to said detecting means for selecting the special video program during the nontransmission time of the reproduced video programs to produce a special video selection signal representative of selection of the special video program; and processing means for processing the special video selection signal to send the connection control signal to the connection signal supply means and to make the switching means transmit the special video program to the subscriber terminal.

4. A video server as claimed in claim 3, wherein the detecting means comprises:

response time calculating means, responsive to the request, for calculating, as the nontransmission time, a response time required to reproduce the video programs requested by the subscriber terminal;

informing means for informing the selecting means of the response time to indicate the nontransmission time of the reproduced video program; and wherein said selecting means selects the special video program whose length does not exceed the response time.

5. A video server as claimed in claim 3, said video server being operable in response to reproduction control commands which are sent from the subscriber terminal and which include a specific reproduction control command put the video storage means into a nontransmission state, wherein the detecting means comprises:

specific command detecting means for detecting the specific reproduction control command to make the video storage means execute the specific reproduction control command for the duration of executing the specific reproduction control command without transmission of the video program; and indicating means for indicating the duration of executing the specific reproduction control command as the nontransmission time of the video program to the processing means.

6. A video server for use in delivering the video programs to a plurality of subscriber terminals in response to a request sent from each of the subscriber terminals, said video server comprising:

a plurality of video storage units for storing the video programs to produce reproduced video programs representative of the video programs, respectively;

a special video storage unit for storing a special video program to produce a reproduced special video program representative of the special video program;

switching means for switching the reproduced video programs and the reproduced special video program from one to another in response to a connection control signal to send a selected one of the reproduced video programs and the reproduced special video program to each of the subscriber terminals;

control means, operable in response to the request, for controlling the video storage means, the special video storage, and the switching means, to produce a selection signal representative of selection of the special program even when the request requires delivery of the video program to each of the subscriber terminals; and connection signal supply means for supplying the selection signal as the connection control signal to the switching means to make the special video storage transmit the reproduced special video program to each of the subscriber terminals that issues the request to the video server;

said control means comprising:

response time calculating means, responsive to the request, for calculating a response time required to reproduce each of the video programs requested by each of the subscriber terminals;

selecting means coupled to said response time calculating means for selecting the special video program whose length in time does not exceed the response time to produce a special video selection signal representative of selection of the special video program; and processing means for processing the special video selection signal to send the connection control signal to the connection signal supply means and to make the switching means transmit the special video program to the subscriber terminal during the response time and to thereafter make the switching means transmit each of the video programs requested by each of the subscriber terminals.

7. A video server for use in delivering a plurality of video programs to a plurality of subscriber terminals, said video server comprising:

a plurality of video storage units for storing the video programs to produce reproduced video programs representative of the video programs, respectively;

a special video storage unit for storing a special video program to produce a reproduced special video program representative of the special video program;

switching means for switching the reproduced video programs and the reproduced special video program from one to another in response to a connection control signal to send a selected one of the reproduced video programs and the reproduced special video program to each of the subscriber terminals;

control means, operable in response to a reproduction control command which is sent from each of the subscriber terminals and which is classified into a first command related to the video programs and a second command related to the special video program, for controlling the video storage units, the special video storage unit, and the switching means, in different manners determined for the first and the second command, respectively;

said control means comprising, managing means for managing the video programs and the special video program which are currently sent to the respective subscriber terminals, judging means for judging the reproduction control command to be valid and invalid when the first command and the second command are received, respectively, and instructing means coupled to the managing means and the judging means for instructing the video storage units about execution of the first command when the reproduction control command is judged to be valid and for instructing the special storage unit about nonexecution of the second command when the reproduction control command is judged to be invalid by the judging means.

* * * * *